United States Patent

Shoemaker

[11] 3,975,087
[45] Aug. 17, 1976

[54] FOUR ELEMENT MICROSCOPE OBJECTIVE

[75] Inventor: Arthur H. Shoemaker, East Aurora, N.Y.

[73] Assignee: American Optical Corporation, Southbridge, Mass.

[22] Filed: Aug. 1, 1975

[21] Appl. No.: 601,006

[52] U.S. Cl. .......................... 350/175 ML; 350/230
[51] Int. Cl.² ..................... G02B 9/04; G02B 21/02
[58] Field of Search ...................... 350/175 ML, 230

[56] References Cited
UNITED STATES PATENTS

| | | |
|---|---|---|
| 3,176,583 | 4/1965 | Klein............................ 350/175 ML |
| 3,227,041 | 1/1966 | Muszumaski ....................... 350/230 |

*Primary Examiner*—John K. Corbin
*Assistant Examiner*—Conrad Clark
*Attorney, Agent, or Firm*—Alan H. Spencer; William C. Nealon; H. R. Berkenstock, Jr.

[57] ABSTRACT

A four element microscope objective has a predetermined magnification and a numerical aperture of substantially 0.10. The microscope objective provides correction for the usual chromatic aberrations as well as spherical aberrations, coma, astigmatism and a substantially flat image field over a 24mm field when used with a telescope objective as described in U.S. Pat. No. 3,355,234 and a typical 10× eyepiece.

4 Claims, 1 Drawing Figure

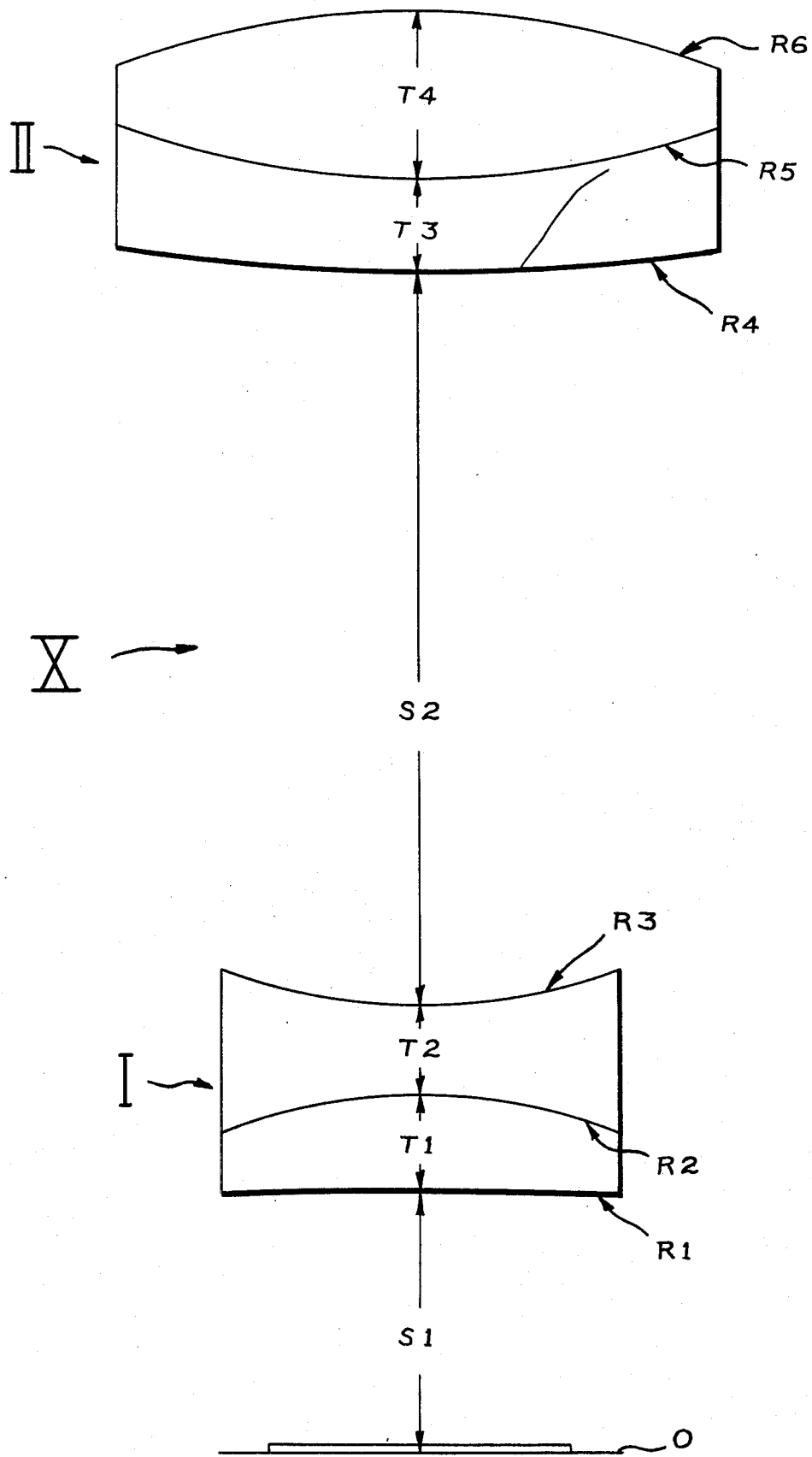

FOUR ELEMENT MICROSCOPE OBJECTIVE

BACKGROUND OF THE INVENTION

This invention relates to microscope objectives and in particular to an achromatic objective with a numerical aperture of substantially 0.10 and a predetermined magnification. It is an object of this invention to provide such a microscope objective which is well-corrected for the usual chromatic image aberrations as well as spherical aberration, coma, and astigmatism. It is a further object of this invention to provide a microscope objective having a magnification of substantially 4× when used with a telescope objective as described in U.S. Pat. No. 3,355,234. It is a still further object of this invention to provide a microscope objective having a substantially flat image over a 24mm field when used with a telescope objective as described in the aforementioned patent and a typical 10× eyepiece.

THE DRAWING

The DRAWING is a optical diagram of the microscope objective according to the present invention viewed transverse to the optical axis.

DESCRIPTION OF THE INVENTION AND PREFERRED EMBODIMENT

Referring to FIG. 1, a microscope objective X has two elements. The foremost element I is a double concave negative doublet and the rearmost element II is a double convex positive doublet.

With respect to lens parameters, the sucessive radii are designated R1 to R6, where the minus sign (−) applies to surfaces whose center of curvature lies on the object side of their vertices. The axial thicknesses of successive lenses are designated T1 to T4, and successive axial spaces from the object plane 0 are designated S1 and S2. Refractive indices and Abbe numbers are absolute values and designated ND(1) to ND(4) and $\nu(1)$ to $\nu(4)$, respectively.

Table I sets forth one embodiment according to the present invention.

TABLE I

| Lens | Radius (R) | Thickness (T) | Spacing (S) | Index of Refraction (ND) | Abbe No. ($\nu$) |
|---|---|---|---|---|---|
|  |  |  | $S_1 = 0.24167F$ |  |  |
|  | $R_1 = -4.36334F$ |  |  |  |  |
|  |  | $T_1 = 0.04651F$ |  | $ND_1 = 1.78446$ | $\nu_1 = 25.74$ |
| I | $R_2 = -0.25721F$ |  |  |  |  |
|  |  | $T_2 = 0.04070F$ |  | $ND_2 = 1.51867$ | $\nu_2 = 64.45$ |
|  | $R_3 = 0.27059F$ |  |  |  |  |
|  |  |  | $S_2 = 0.48271F$ |  |  |
|  | $R_4 = 0.96467F$ |  |  |  |  |
|  |  | $T_3 = 0.04070F$ |  | $ND_3 = 1.78446$ | $\nu_3 = 25.74$ |
| II | $R_5 = 0.42024F$ |  |  |  |  |
|  |  | $T_4 = 0.07558F$ |  | $ND_4 = 1.48725$ | $\nu_4 = 70.40$ |
|  | $R_6 = -0.39640F$ |  |  |  |  |

Wherein F is the focal length of the objective in millimeters.

The preferred embodiment of the present invention is when the focal length is 43.000mm and Table II contains the numerical data for this embodiment.

TABLE II

| Lens | Radius (R) | Thickness (T) | Spacing (S) |
|---|---|---|---|
|  |  |  | $S_1 = 110.3914$ |
|  | $R_1 = -187.620$ |  |  |
|  |  | $T_1 = 2.000$ |  |
| I | $R_2 = -11.060$ |  |  |
|  |  | $T_2 = 1.750$ |  |
|  | $R_3 = 11.635$ |  |  |
|  |  |  | $S_2 = 20.756$ |
|  | $R_4 = 41.480$ |  |  |
|  |  | $T_3 = 1.750$ |  |
| II | $R_5 = 18.070$ |  |  |
|  |  | $T_4 = 3.250$ |  |
|  | $R_6 = -17.045$ |  |  |

Another embodiment of the present invention has the following values:

TABLE III

| Lens | Radius (R) | Thickness (T) | Spacing (S) | Index of Refraction (ND) | Abbe No. ($\nu$) |
|---|---|---|---|---|---|
|  |  |  | $S_1 = 0.18898F$ |  |  |
|  | $R_1 = -0.85745F$ |  |  |  |  |
|  |  | $T_1 = 0.04483F$ |  | $ND_1 = 1.78444$ | $\nu_1 = 26.10$ |
| I | $R_2 = -0.18368F$ |  |  |  |  |
|  |  | $T_2 = 0.02242F$ |  | $ND_2 = 1.48743$ | $\nu_2 = 70.43$ |
|  | $R_3 = 0.24121F$ |  |  |  |  |
|  |  |  | $S_2 = 0.54657F$ |  |  |
|  | $R_4 = 0.93412F$ |  |  |  |  |
|  |  | $T_3 = 0.3923F$ |  | $ND_3 = 1.78444$ | $\nu_3 = 26.10$ |
| II | $R_5 = 0.41337F$ |  |  |  |  |
|  |  | $T_4 = 0.7286F$ |  | $ND_4 = 1.48743$ | $\nu_4 = 70.43$ |
|  | $R_6 = -0.41337F$ |  |  |  |  |

Wherein F is the focal length of the objective in millimeters.

One successful form of this embodiment has a focal length of 44.609mm providing the following values:

TABLE IV

| Lens | Radius (R) | Thickness (T) | Spacing (S) | Index of Refraction (ND) | Abbe No. ($\nu$) |
|---|---|---|---|---|---|
|  |  |  | $S_1 = 8.430$ |  |  |
|  | $R_1 = -38.250$ |  |  |  |  |

TABLE IV-continued

| Lens | Radius (R) | Thickness (T) | Spacing (S) | Index of Refraction (ND) | Abbe No. ($\nu$) |
|---|---|---|---|---|---|
| I | $R_2 = -8.194$ | $T_1 = 2.000$ | | $ND_1 = 1.78444$ | $\nu_1 = 26.10$ |
| | $R_3 = 10.760$ | $T_2 = 1.000$ | | $ND_2 = 1.48743$ | $\nu_2 = 70.43$ |
| | $R_4 = 41.670$ | | $S_2 = 24.382$ | | |
| II | $R_5 = 18.440$ | $T_3 = 1.750$ | | $ND_3 = 1.78444$ | $\nu_3 = 26.10$ |
| | $R_6 = -18.440$ | $T_4 = 3.250$ | | $ND_4 = 1.48743$ | $\nu_4 = 70.43$ |

It will be apparent that the foregoing is variable depending upon the value of F. Other forms of the invention according to Tables I or III are thus possible and changes may be made based upon the relationships set forth therein without departing from the spirit of this invention.

What is claimed is:

1. A two component microscope objective having a predetermined magnification and numerical aperature of substantially 0.10 comprising a double concave negative doublet I and a double convex positive doublet II aligned along an optical axis and has the following parameters

| Lens | Radius (R) | Thickness (T) | Spacing (S) | Index of Refraction (ND) | Abbe No. ($\nu$) |
|---|---|---|---|---|---|
| | | | $S_1 = 0.24167F$ | | |
| I | $R_1 = -4.36334F$ | | | | |
| | | $T_1 = 0.04651F$ | | $ND_1 = 1.78446$ | $\nu_1 = 25.74$ |
| | $R_2 = -0.25721F$ | | | | |
| | | $T_2 = 0.04070F$ | | $ND_2 = 1.51867$ | $\nu_2 = 64.45$ |

-continued

| Lens | Radius (R) | Thickness (T) | Spacing (S) | Index of Refraction (ND) | Abbe No. ($\nu$) |
|---|---|---|---|---|---|
| | $R_3 = 0.27059F$ | | | | |
| | | | $S_2 = 0.48271F$ | | |
| | $R_4 = 0.96467F$ | | | | |
| | | $T_3 = 0.04070F$ | | $ND_3 = 1.78446$ | $\nu_3 = 25.74$ |
| II | $R_5 = 0.42024F$ | | | | |
| | | $T_4 = 0.07558F$ | | $ND_4 = 1.48725$ | $\nu_4 = 70.40$ |
| | $R_6 = 0.39640F$ | | | | | wherein F is the focal length of the objective in millimeters.

2. The microscope objective according to claim 1 wherein F equals 43.000mm.

3. A two component microscope objective having a predetermined magnification and numerical aperature of substantially 0.10 comprises a double concave negative doublet I and a double convex positive doublet II aligned along an optical axis and has the following parameters

| Lens | Radius (R) | Thickness (T) | Spacing (S) | Index of Refraction (ND) | Abbe No. ($\nu$) |
|---|---|---|---|---|---|
| | $R_1 = -0.85745F$ | | $S_1 = 0.18898F$ | | |
| I | | $T_1 = 0.04483F$ | | $ND_1 = 1.78444$ | $\nu_1 = 26.10$ |
| | $R_2 = -0.18368F$ | $T_2 = 0.02242F$ | | $ND_2 = 1.48743$ | $\nu_2 = 70.43$ |
| | $R_3 = 0.24121F$ | | | | |
| | $R_4 = 0.93412F$ | | $S_2 = 0.54657F$ | | |
| II | $R_5 = 0.41337F$ | $T_3 = 0.3923F$ | | $ND_3 = 1.78444$ | $\nu_3 = 26.10$ |
| | $R_6 = -0.41337F$ | $T_4 = 0.7286F$ | | $ND_4 = 1.48743$ | $\nu_4 = 70.43$ | wherein F is the focal length of the objective in millimeters.

4. The microscope objective according to claim 3 wherein F equals 44.609mm.

* * * * *